United States Patent
Adams et al.

(10) Patent No.: US 12,434,838 B1
(45) Date of Patent: Oct. 7, 2025

(54) DEPLOYABLE EGRESS RAMP SYSTEMS AND METHODS FOR AIRCRAFT

(71) Applicant: THE BOEING COMPANY, Arlington, VA (US)

(72) Inventors: Martin Clive Adams, Everett, WA (US); Gregory Allen Tubbs, Marysville, WA (US); Sang Koh, Kenmore, WA (US)

(73) Assignee: The Boeing Company, Alexandria, VA (US)

( * ) Notice: Subject to any disclaimer, the term of this patent is extended or adjusted under 35 U.S.C. 154(b) by 0 days.

(21) Appl. No.: 18/754,304

(22) Filed: Jun. 26, 2024

(51) Int. Cl.
*B64D 9/00* (2006.01)

(52) U.S. Cl.
CPC ..................... *B64D 9/00* (2013.01)

(58) Field of Classification Search
CPC . B64C 1/22; B64C 1/1415; B64F 1/30; B64F 1/3055; A47B 3/083
See application file for complete search history.

(56) References Cited

U.S. PATENT DOCUMENTS

| | | | | |
|---|---|---|---|---|
| 3,046,595 A | * | 7/1962 | Johansson | A47B 3/083 108/166 |
| 5,024,138 A | * | 6/1991 | Sanderson | F41A 23/00 89/37.19 |
| 5,421,239 A | * | 6/1995 | Sanderson | B64D 7/00 89/37.16 |
| 6,241,185 B1 | * | 6/2001 | Sanderson | B64D 7/02 244/118.1 |
| 8,726,817 B2 | * | 5/2014 | Bennett | A47B 3/08 108/115 |
| 2005/0241550 A1 | * | 11/2005 | Neunzert | A47B 3/00 108/129 |

FOREIGN PATENT DOCUMENTS

DE            3943398 A    * 7/1991    ............. A47B 3/083

OTHER PUBLICATIONS

Merged version with translation of DE 3943398 A1 (Year: 1991).*

* cited by examiner

*Primary Examiner* — Nicholas McFall
(74) *Attorney, Agent, or Firm* — Joseph M. Butscher; The Small Patent Law Group LLC (57) ABSTRACT

A ramp system and method are configured for use between a jetway and an internal cabin of an aircraft. The ramp system and method include a first panel, a second panel, and a pivot axle that pivotally couples the first panel to the second panel. The first panel and the second panel are configured to rotate relative to one another about the pivot axle between a closed position, in which the ramp system is stowable within the internal cabin, and an open position, in which the ramp system is deployable over and between a first portion of the jetway and a second portion of a floor of the internal cabin. The ramp system is configured to be secured to escape slide arming brackets.

20 Claims, 9 Drawing Sheets

DEPLOYABLE EGRESS RAMP SYSTEMS AND METHODS FOR AIRCRAFT

FIELD OF THE DISCLOSURE

Examples of the present disclosure generally relate to deployable egress ramps systems and methods for an aircraft, such as can be used by individuals during boarding and disembarking the aircraft.

BACKGROUND OF THE DISCLOSURE

Commercial aircraft are used to transport passengers between various locations. During a boarding phase, certain individuals having limited mobility may use wheelchairs as they move from a gate to a jetway, and into an internal cabin of aircraft. As such, care is taken by gate agents or other personnel to ensure that wheelchairs are safely and efficiently moved into the internal cabin.

However, a gap may exist between the jetway and the threshold of the aircraft. Front wheels of a wheelchair may catch within the gap, which can cause discomfort and/or unease in certain individuals.

SUMMARY OF THE DISCLOSURE

A need exists for an effective and efficient system and method for safely moving a wheelchair into and out of an internal cabin of an internal cabin from a jetway, such as during boarding and disembarking phases.

With that need in mind, certain examples of the present disclosure provide a ramp system configured for use between a jetway and an internal cabin of an aircraft. The ramp system includes a first panel, a second panel, and a pivot axle that pivotally couples the first panel to the second panel. The first panel and the second panel are configured to rotate relative to one another about the pivot axle between a closed position, in which the ramp system is stowable within the internal cabin, and an open position, in which the ramp system is deployable over and between a first portion of the jetway and a second portion of a floor of the internal cabin.

In at least one example, the pivot axle includes a hollow cylinder.

The ramp system can also include one more first cuffs that rotatably secure the pivot axle to the first panel, and one or more second cuffs that rotatably secure the pivot axle to the second panel. As a further example, the one or more first cuffs connect to one or more first tabs secured to a first lower surface of the first panel, and the one or more second cuffs connect to one or more second tabs secured to a second lower surface of the second panel.

The ramp system can also include one or more first latches extending from a first lower surface of the first panel, and one or more pins extending from a second lower surface of the second panel. The one or more first latches are configured to receive and retain the one or more pins to secure the ramp system in the closed position. As a further example, the one or more pins are configured to be secured to one or more second latches of one or more escape slide arming brackets when the ramp system is deployed over and between the first portion of the jetway and the second portion of the floor of the internal cabin. As a further example, one or more release levers of the one or more escape slide arming brackets are configured to be engaged so that the one or more pins can be removed from the one or more second latches.

The ramp system can also include one or more first gripping strips extending across a first upper surface of the first panel, and one or more second gripping strips extending across a second upper surface of the second panel.

Certain examples of the present disclosure provide a method including moving the ramp system into the closed position by rotating the first panel relative to the second panel in a first rotational direction about the pivot axle; stowing the ramp system in the closed position within the internal cabin; moving the ramp system into the open position by rotating the first panel relative to the second panel in a second rotational direction about the pivot axle, wherein the second rotational direction is opposite from the first rotational direction; and deploying the ramp system in the open position over and between the first portion of the jetway and the second portion of a floor of the internal cabin.

Certain examples of the present disclosure provide a system including an aircraft, a jetway, and a ramp system, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Examples of the present disclosure provide a folding, stow-able egress ramp for use at a primary entry point of an aircraft from a jetway. The systems and methods described herein allow for safe and easy movement of wheelchairs (and other wheeled components) into and out of an internal cabin of the aircraft.

The ramp systems and methods described herein allow various wheeled components (such as wheelchairs, galley carts, cleaning equipment, mobility scooters, a wheeled stretcher, and the like) to cross a threshold of an aircraft from a jetway without catching wheels in a gap therebetween or on a rim of the door threshold. Further, the ramp systems and methods described herein effectively widen the usable threshold by raising it above radiused corners of the threshold.

Figure 1:
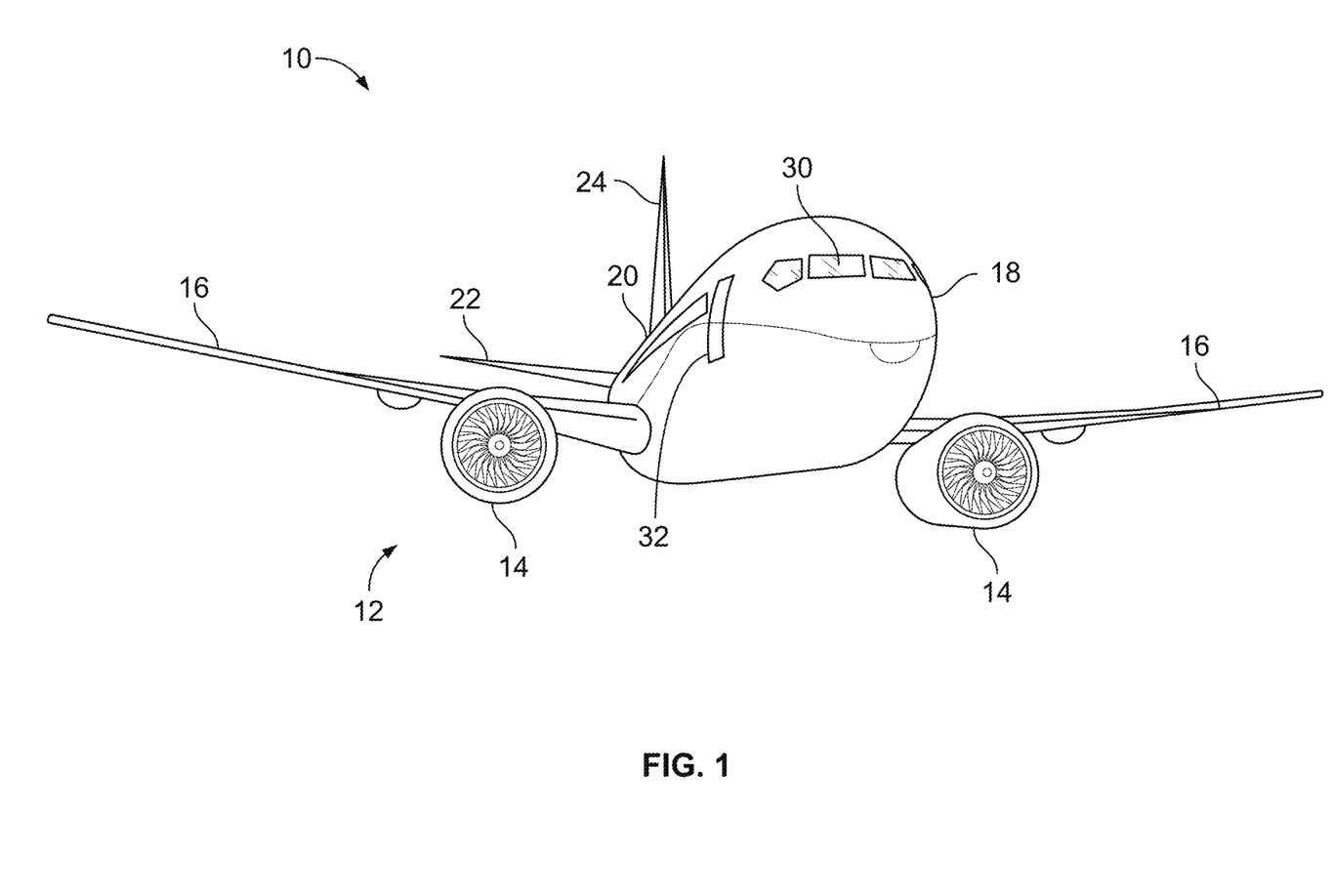
FIG. 1 illustrates a perspective front view of an aircraft, according to an example of the present disclosure.

FIG. 1 illustrates a perspective front view of an aircraft 10, according to an example of the present disclosure. The aircraft 10 includes a propulsion system 12 that includes engines 14, for example. Optionally, the propulsion system 12 may include more engines 14 than shown. The engines 14 are carried by wings 16 of the aircraft 10. In other examples, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin 30, which includes a flight deck or cockpit, one or more work sections (for example, galleys, personnel carry-on baggage areas, and the like), one or more passenger sections (for example, first class, business class, and coach sections), one or more lavatories, and/or the like. A door 32 closes a threshold that leads into the internal cabin 30. The door 32 is configured to be opened during a boarding phase to allow individuals to pass into the internal cabin, and a disembarking phase to allow the individuals to leave the internal cabin 30.

The aircraft 10 can be sized and shaped differently than shown. It is to be understood that the aircraft 10 shown in FIG. 1 is merely an example.

Optionally, instead of an aircraft, examples of the present disclosure may be used with various other vehicles, such as automobiles, buses, locomotives and train cars, watercraft, spacecraft and the like. Further, examples of the present disclosure may be used with respect to fixed structures, such as commercial and residential buildings.

Figure 2:
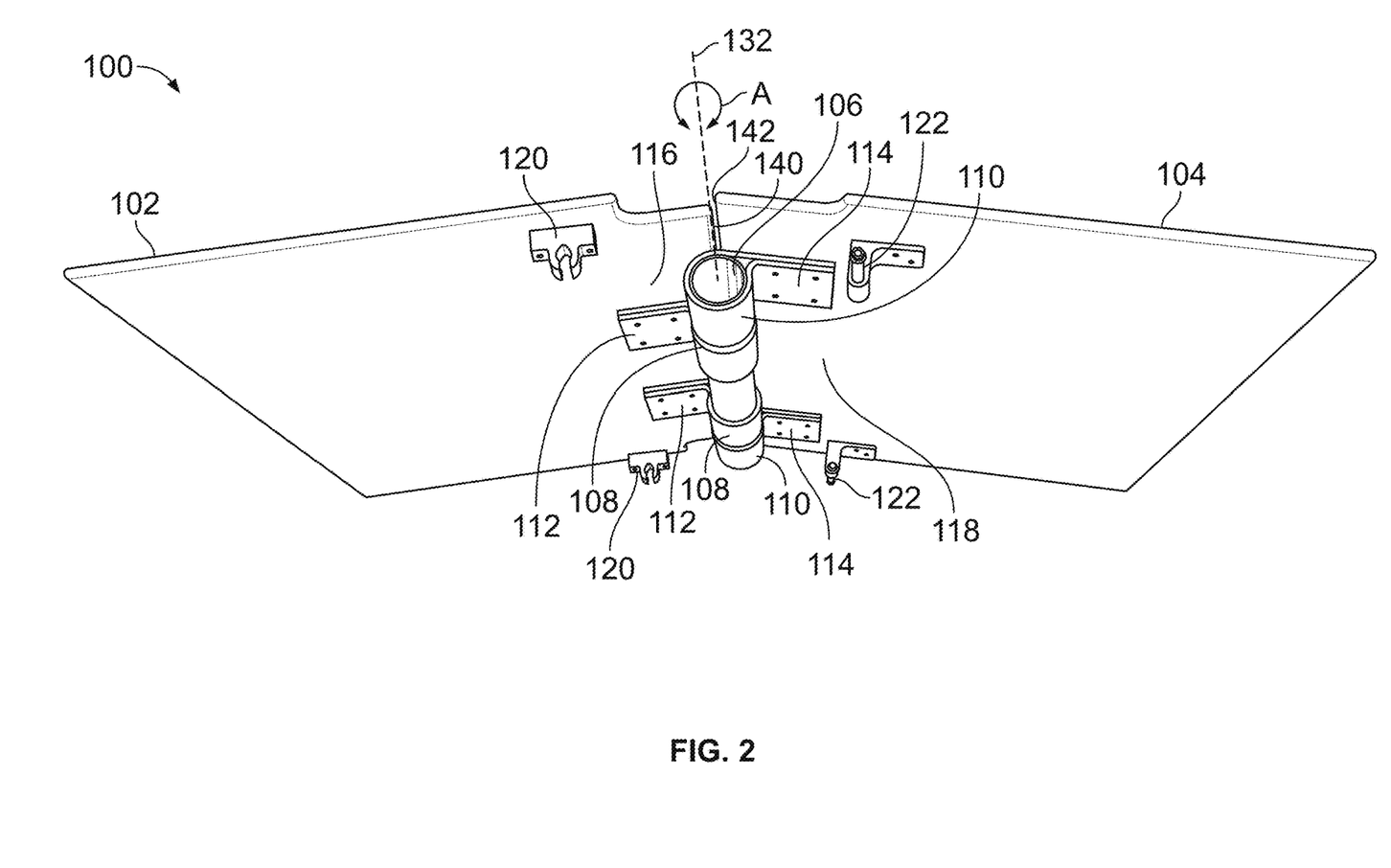
FIG. 2 illustrates an isometric bottom view of a ramp system in a fully opened position, according to an example of the present disclosure.

FIG. 2 illustrates an isometric bottom view of a ramp system 100 in a fully opened position, according to an example of the present disclosure. The ramp system 100 includes a first panel 102 pivotally coupled to a second panel 104 by a pivot axle 106. In at least one example, the first panel 102 and the second panel 104 are sized and shaped the same. The first panel 102 and the second panel 104 can be formed of a metal, such as aluminum, titanium, or the like. As another example, the first panel 102 and the second panel 104 can include a reinforced metal core covered in plastic and/or composite material. The fully opened position is a deployed position of the ramp system 100.

In at least one example, the pivot axle 106 is a metal tube, such as formed of aluminum, titanium, or the like. As another example, the pivot axle 106 is a carbon fiber tube. In order to decrease weight, the pivot axle 106 can be a hollow cylinder. Optionally, the pivot axle 106 can be a sold cylindrical rod. One or more cuffs 108 rotatably secure the pivot axle 106 to the first panel 102, and one or more cuffs 110 rotatably secure the pivot axle 106 to the second panel 104. The cuffs 108 and 110 connect to one or more flat tabs 112 and 114, respectively, which are secured to respectively lower surfaces 116 and 118 of the first panel 102 and the second panel 104. The pivot axle 106 is rotatably retained by the cuffs 108 and 110 and is configured to rotate therein.

One or more latches 120 downwardly extend from the lower surface 116 of the first panel 102. One or more pins 122 extend from the lower surface 118 of the second panel 104. As described herein, the latches 120 are configured to receive and latchably retain the pins 122 to secure the ramp system 100 in a closed position. As shown, the first panel 102 includes two latches 120, while the second panel 104 includes two pins 122. Optionally, the ramp system 100 may include more or fewer latches 120 and pins 122 than shown. Alternatively, the ramp system 100 may not include the latches 120 and/or the pins 122.

Figure 3:
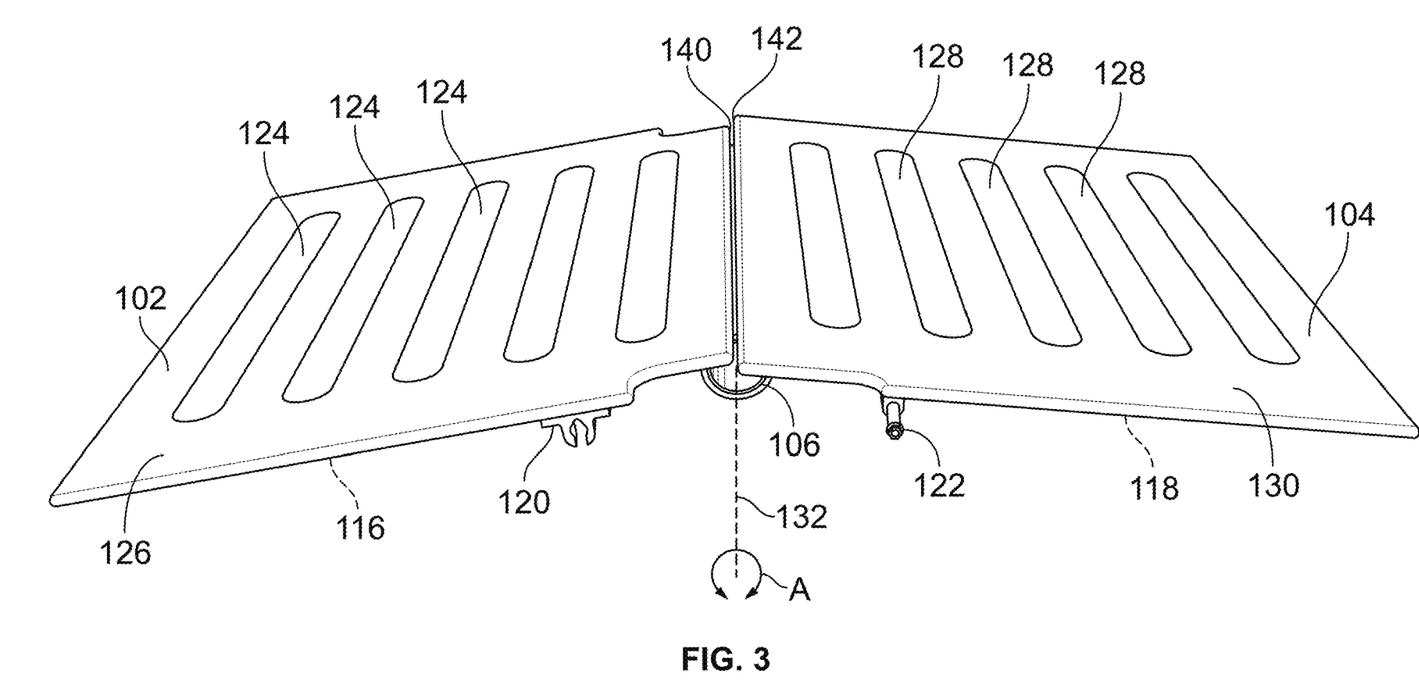
FIG. 3 illustrates an isometric top view of the ramp system in the fully opened position.

FIG. 3 illustrates an isometric top view of the ramp system 100 in the fully opened position. One or more gripping strips 124 can extend across an upper surface 126 of the first panel 102. Similarly, one or more gripping strips 128 can extend across an upper surface 130 of the second panel 104. The gripping strips 124 and 128 can be formed of rubber, a textured plastic, or the like, and are secured to the upper surfaces 124 and 128, respectively, such as via adhesives, bonding, fasteners, and/or the like. Optionally, the first panel 102 and the second panel 104 may not include the gripping strips 124 and/or 126.

Referring to FIGS. 2 and 3, the first panel 102 and the second panel 104 are configured to rotate relative to one another about a central axis 132 of the pivot axle 106 in the directions of arc A between the fully opened position, and a closed position. As the first panel 102 and the second panel 104 rotate into the fully open position (that is, the deployed position), an inboard internal end edge 140 of the first panel 102 can abut against an inboard internal end edge 142 of the second panel 104, thereby ceasing any further motion past the fully opened position.

Figure 4:
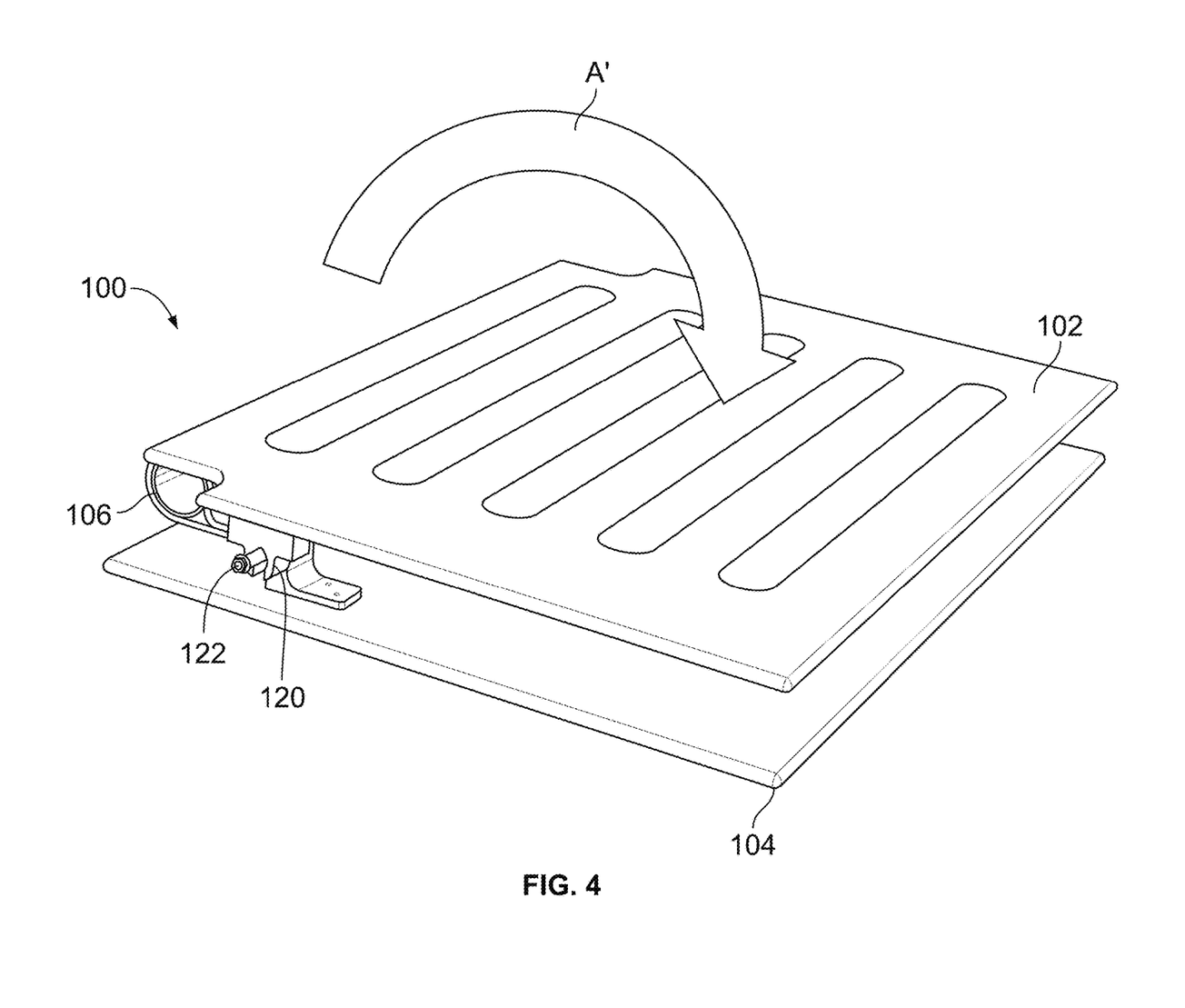
FIG. 4 illustrates an isometric lateral view of the ramp system in a closed position.

FIG. 4 illustrates an isometric lateral view of the ramp system 100 in a closed position. Referring to FIGS. 2-4, in order to close the ramp system 100, the first panel 102 is rotated relative to the second panel 104 about the pivot axle 106 in the direction of arc A' (shown in FIG. 4) to provide a compact structure. The latches 120 may receive and latchably retain the pins 122 to secure the ramp system 100 in the closed position. The compactness of the ramp system 100 in the closed position allows for the ramp system 100 to be readily and easily stowed, such as within a closet, a galley compartment, or the like.

Optionally, instead of latches and pins, the first panel 102 and the second panel 104 can include various other structures that allow for securing in the closed position. For example, the first panel 102 and the second panel 104 can include magnets, clasps, ties, snaps, and/or the like instead of (or in addition to) the latches 120 and the pins 122.

Figure 5:
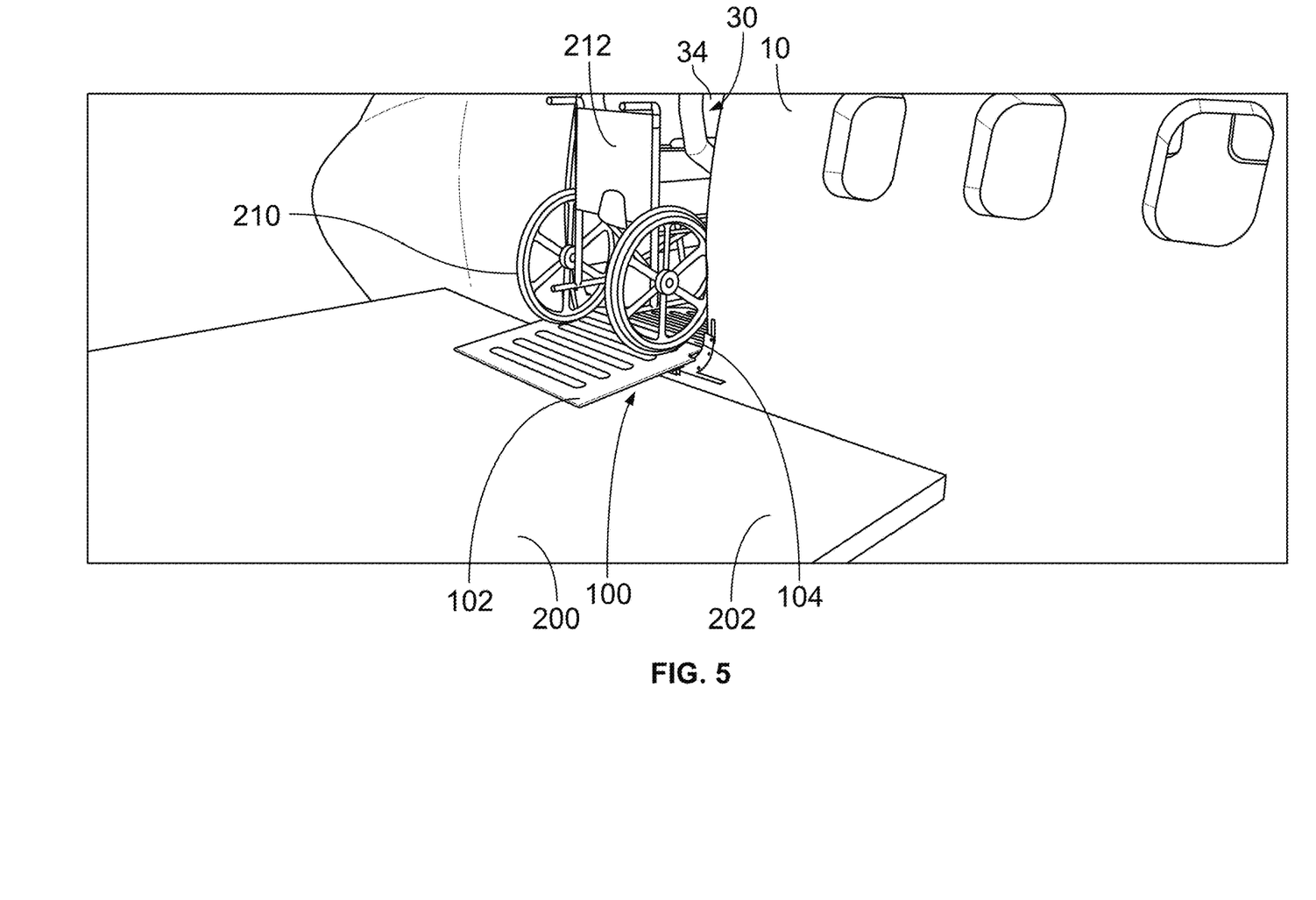
FIG. 5 illustrates an isometric view of the ramp system deployed between a jetway and a threshold of an aircraft, according to an example of the present disclosure.
Figure 6:
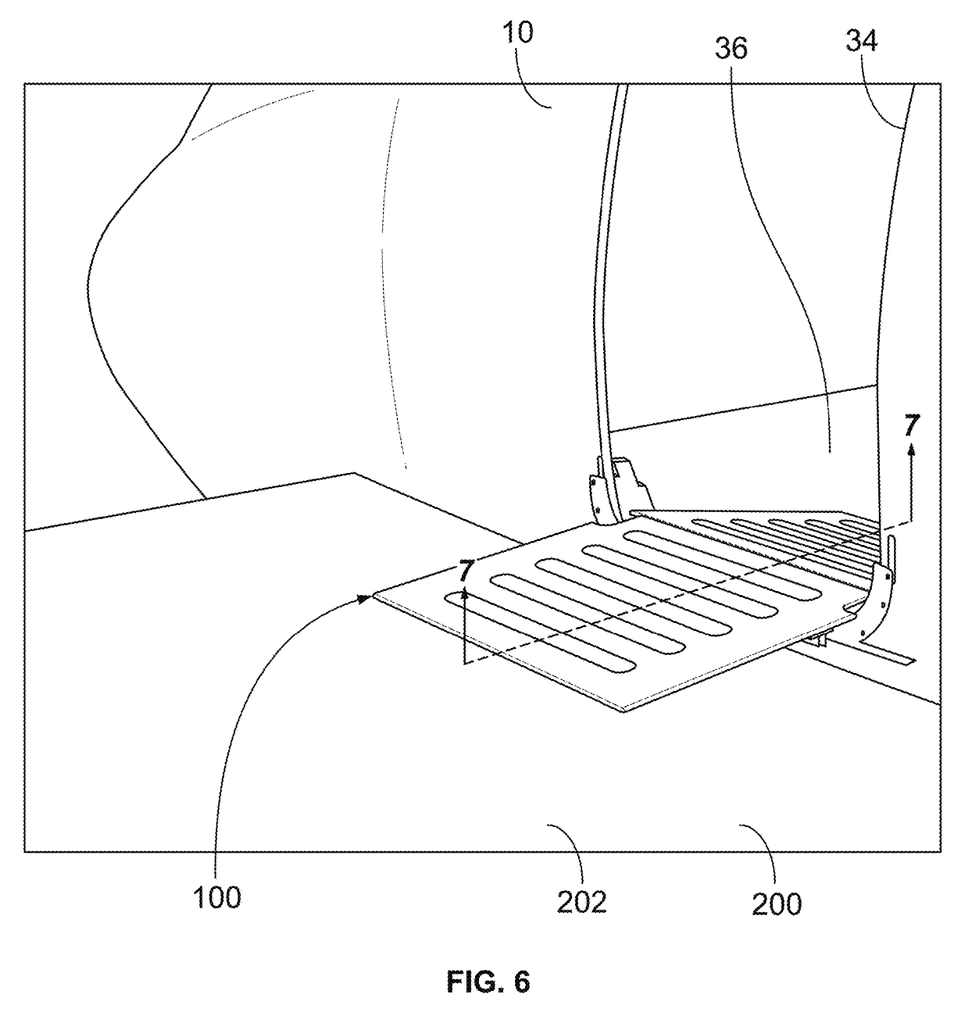
FIG. 6 illustrates an isometric side of the ramp system deployed between the jetway and threshold of the aircraft.
Figure 7:
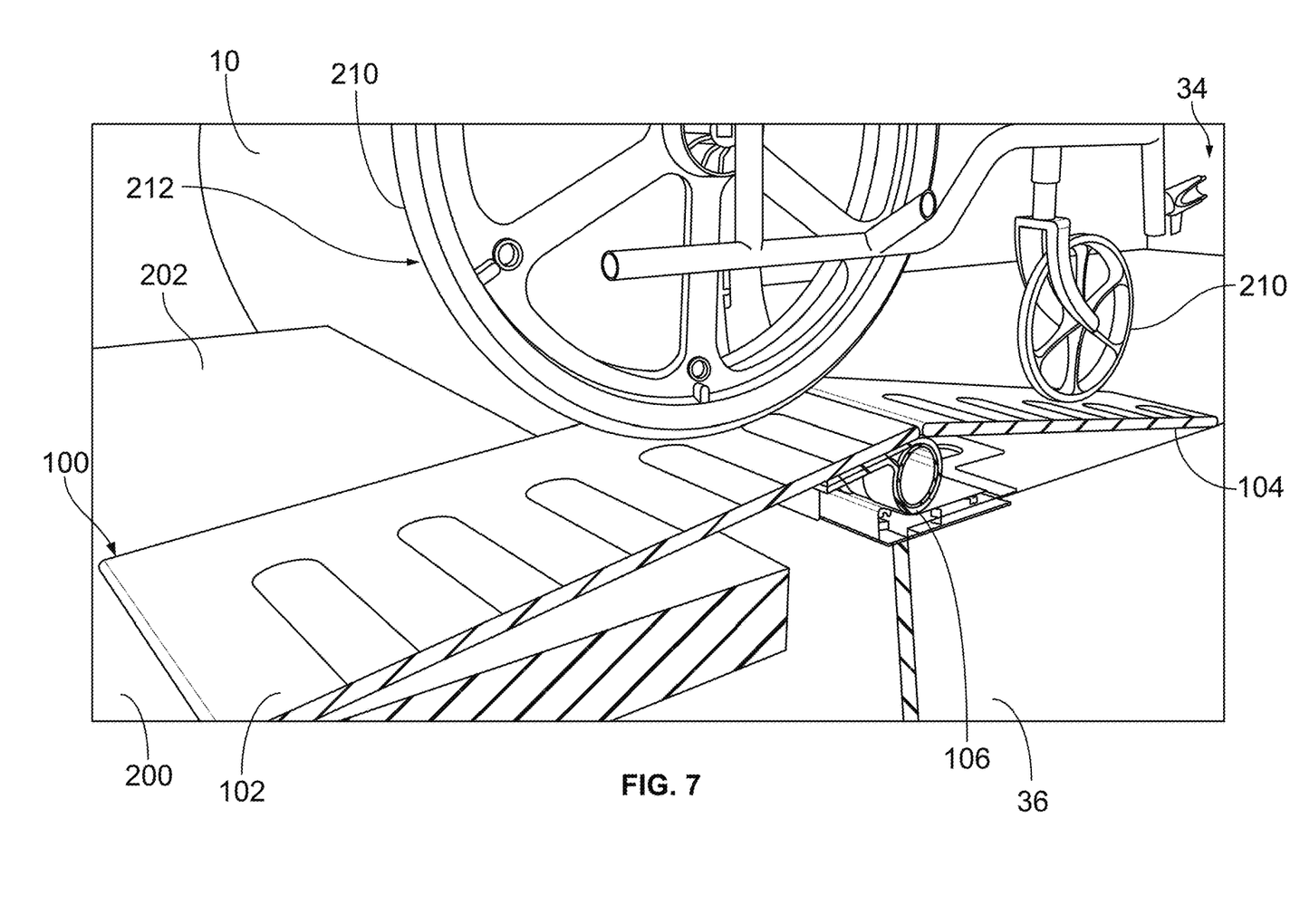
FIG. 7 illustrates an isometric cross-sectional view of the ramp system of FIG. 6 deployed between the jetway and the threshold of the aircraft.

FIG. 5 illustrates an isometric view of the ramp system 100 deployed between a jetway 200 and a threshold 34 of an aircraft 10, according to an example of the present disclosure. FIG. 6 illustrates an isometric side of the ramp system 100 deployed between the jetway 200 and the threshold 34 of the aircraft 10. FIG. 7 illustrates an isometric cross-sectional view of the ramp system 100 of FIG. 6 deployed between the jetway 200 and the threshold 34 of the aircraft 10. Referring to FIGS. 5-7, in the fully opened position (that is, the deployed position), the ramp system 100 extends over and between a support surface 202 of the jetway 200, and a floor 36 of the internal cabin 30. In this manner, the ramp system 100 extends over any gap between the support surface 202 of the jetway 200 and the floor 36 of the internal cabin 30. As such, wheels 210 of a wheelchair 212, for example, are not susceptible to catching in any gap as the wheelchair 212 is moved into and out of the internal cabin 30. Further, rotational motion between the first panel 102 and the second panel 104 further allows for levelling compensation between the support surface 202 of the jetway 200 and the floor 36 of the internal cabin 30.

Figure 8:
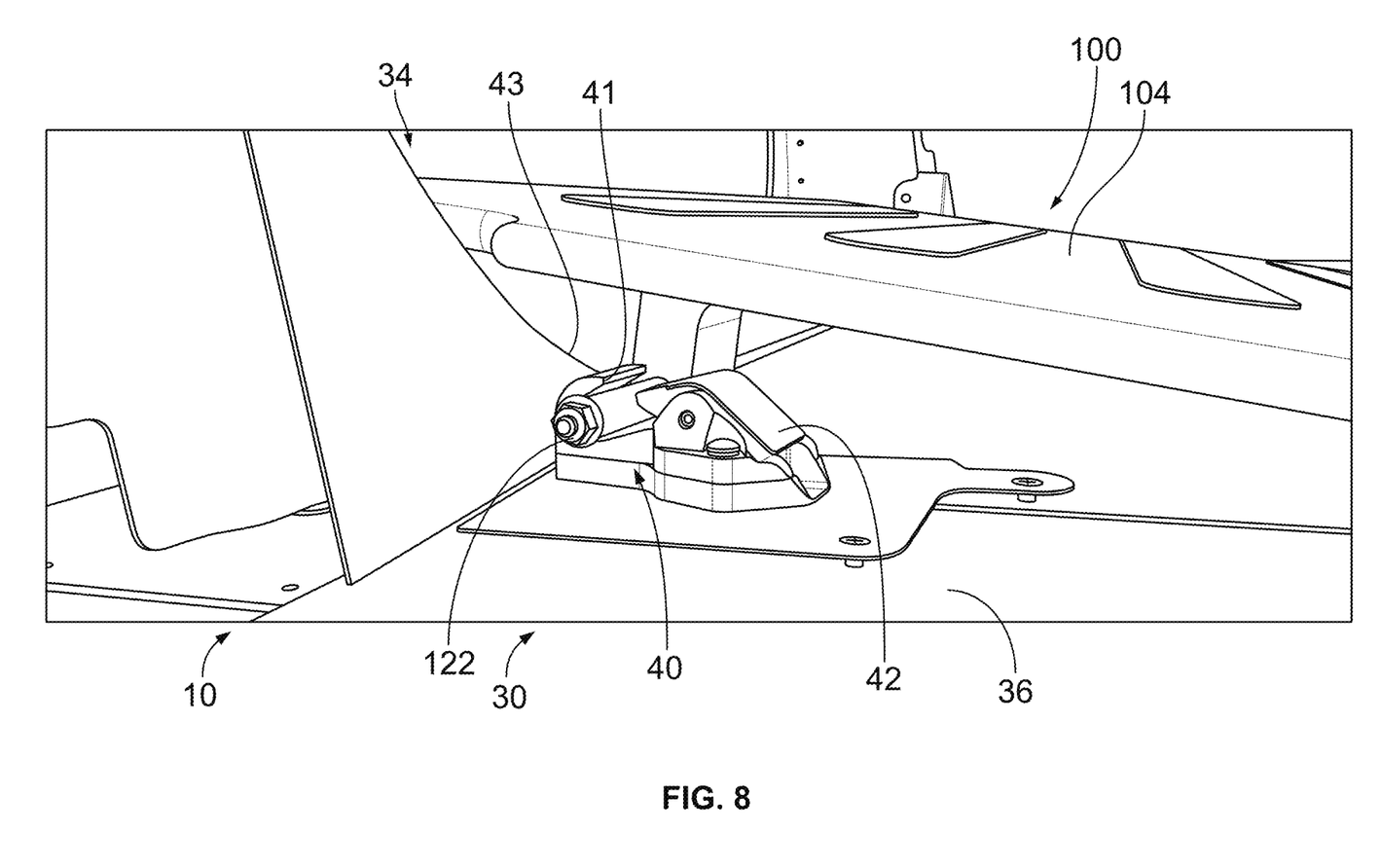
FIG. 8 illustrates an isometric side view of the ramp system secured to escape slide arming brackets within an internal cabin of an aircraft, according to an example of the present disclosure.

FIG. 8 illustrates an isometric side view of the ramp system 100 secured to escape slide arming brackets 40 within the internal cabin 30 of an aircraft 10, according to an example of the present disclosure. The escape slide arming brackets 40 are secured to the floor 36, and are proximate to the threshold 34, such as proximate to lower sides of the threshold 34. The escape slide arming brackets 40 include latches 41, which are configured to securely retain anchoring members of an escape slide, if an escape slide is used during an emergency, for example.

In order to securely anchor the ramp system 100 in place during a boarding phase or disembarking phase, the latches 41 of the escape slide arming brackets 40 receive and retain the pins 122 of the ramp system 100. In this manner, the ramp system 100 is locked in place in a desired position that covers any gap between the floor 36 of the internal cabin 30 and the support surface 202 of the jetway 200 (shown in FIGS. 5-7). Accordingly, the ramp system 100 is secured from shifting or otherwise moving when wheelchairs and individuals move over the ramp system 100 between the jetway 200 and the internal cabin 30. In order to remove the ramp system 100 from the escape slide arming brackets 40, release levers 42 can be engaged so that the pins 122 can be removed from the latches 41.

Optionally, the ramp system 100 can be anchored in place by one or more other mechanisms, such as magnets, clasps, ties, snaps, and/or the like. Alternatively, the ramp system 100 may not be anchored in place by the escape slide arming brackets 40 or any other mechanism.

Referring to FIGS. 5-8, the pivot axle 106 is supported on one or both of the floor 36 and/or the support surface 202 of the jetway 200. In this manner, the pivot axle 106 props portions of the first panel 102 and the second panel 104 above the surfaces of the floor 36 of the internal cabin 30, thereby effectively increasing the passage area of the threshold 34 by raising the ramp system 100 above lower radiused corners 43 of the threshold 34.

As described herein, the ramp system 100 is configured for use between the jetway 200 and the internal cabin 30 of the aircraft 10. The ramp system 100 includes the first panel 102, the second panel 104, and the pivot axle 106, which rotationally couples the first panel 102 to the second panel 104. The first panel 102 and the second panel 104 are configured to rotate relative to one another about the pivot axle 106 between the closed position, in which the ramp system 100 is stowable within the internal cabin 30, and an open position, in which the ramp system 100 is deployable over and between a portion of the jetway 200 (such as a portion of the support surface 202 proximate to (for example, within 5 feet or less) and the floor 36 of the internal cabin 30) and a portion of the floor 36 of the internal cabin 30 (such as a portion of the floor 36 proximate to (for example, within 5 feet or less) and the jetway 200.

Figure 9:
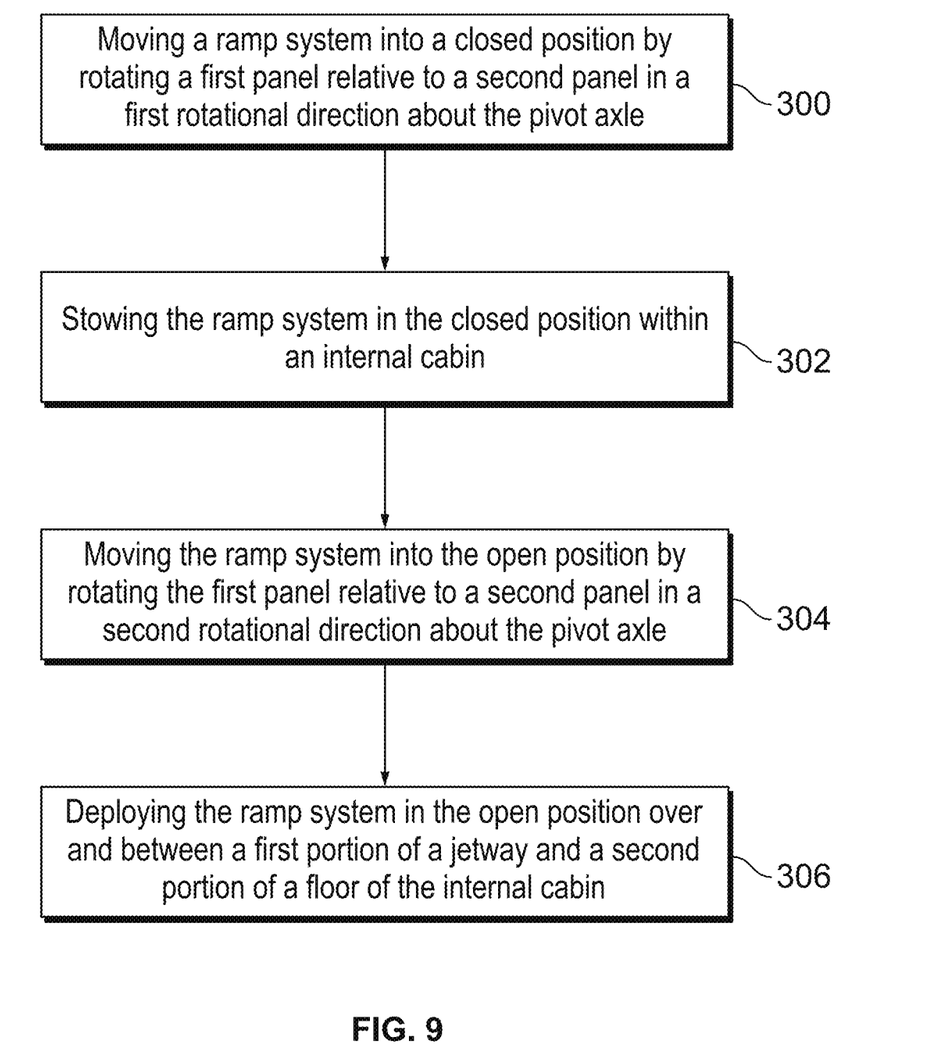
FIG. 9 illustrates a flow chart of a method, according to an example of the present disclosure.

FIG. 9 illustrates a flow chart of a method, according to an example of the present disclosure. Referring to FIGS. 1-9, at 300, the ramp system 100 is moved into a closed position by rotating the first panel 102 relative to the second panel 104 in a first rotational direction about the pivot axle 106. At 302, the ramp system 100 is stowed in the closed position within the internal cabin 30. At 304, the ramp system 100 is moved into an open position by rotating the first panel 102 relative to the second panel 104 in a second rotational direction (opposite from the first rotational direction) about the pivot axle 106. At 306, the ramp system 100 in the is deployed in the open position over and between a first portion of the jetway 200 and a second portion of the floor 36 of the internal cabin 30. In at least one example, the method also includes receiving and retaining the more pins 122 by the one or more first latches 120 to secure the ramp system 100 in the closed position. In at least one further example, the method also includes securing the pins 122 to one or more second latches 41 of one or more escape slide arming brackets 40 when the ramp system 100 is deployed over and between the first portion of the jetway 200 and the second portion of the floor 36 of the internal cabin 30. In at least one further example, the method also includes engaging one or more release levers 42 of the one or more escape slide arming brackets 40 so that the one or more pins 122 can be removed from the one or more second latches 41.

Further, the disclosure comprises examples according to the following clauses:

Clause 1. A ramp system configured for use between a jetway and an internal cabin of an aircraft, the ramp system comprising:
 a first panel;
 a second panel; and
 a pivot axle that pivotally couples the first panel to the second panel, wherein the first panel and the second panel are configured to rotate relative to one another about the pivot axle between a closed position, in which the ramp system is stowable within the internal cabin, and an open position, in which the ramp system is deployable over and between a first portion of the jetway and a second portion of a floor of the internal cabin.

Clause 2. The ramp system of Clause 1, wherein the pivot axle comprises a hollow cylinder.

Clause 3. The ramp system of Clauses 1 or 2, further comprising: one or more first cuffs that rotatably secure the pivot axle to the first panel; and one or more second cuffs that rotatably secure the pivot axle to the second panel.

Clause 4. The ramp system of Clause 3, wherein the one or more first cuffs connect to one or more first tabs secured to a first lower surface of the first panel, and wherein the one or more second cuffs connect to one or more second tabs secured to a second lower surface of the second panel.

Clause 5. The ramp system of any of Clauses 1-4, further comprising: one or more first latches extending from a first lower surface of the first panel; and one or more pins extending from a second lower surface of the second panel, wherein the one or more first latches are configured to receive and retain the one or more pins to secure the ramp system in the closed position.

Clause 6. The ramp system of Clause 5, wherein the one or more pins are configured to be secured to one or more second latches of one or more escape slide arming brackets when the ramp system is deployed over and between the first portion of the jetway and the second portion of the floor of the internal cabin.

Clause 7. The ramp system of Clause 6, wherein one or more release levers of the one or more escape slide arming brackets are configured to be engaged so that the one or more pins can be removed from the one or more second latches.

Clause 8. The ramp system of any of Clauses 1-7, further comprising:
 one or more first gripping strips extending across a first upper surface of the first panel; and
 one or more second gripping strips extending across a second upper surface of the second panel.

Clause 9. A method for a ramp system configured for use between a jetway and an internal cabin of an aircraft, the ramp system comprising:
 a first panel;

a second panel; and
a pivot axle that pivotally couples the first panel to the second panel, wherein the first panel and the second panel are configured to rotate relative to one another about the pivot axle between a closed position, in which the ramp system is stowable within the internal cabin, and an open position, in which the ramp system is deployable over and between a first portion of the jetway and a second portion of a floor of the internal cabin,
the method comprising:
moving the ramp system into the closed position by rotating the first panel relative to the second panel in a first rotational direction about the pivot axle;
stowing the ramp system in the closed position within the internal cabin;
moving the ramp system into the open position by rotating the first panel relative to the second panel in a second rotational direction about the pivot axle, wherein the second rotational direction is opposite from the first rotational direction; and
deploying the ramp system in the open position over and between the first portion of the jetway and the second portion of a floor of the internal cabin.

Clause 10. The method of Clause 9, wherein the ramp system further comprises:
one or more first latches extending from a first lower surface of the first panel; and
one or more pins extending from a second lower surface of the second panel,
wherein the method further comprises receiving and retaining the one or more pins by the one or more first latches to secure the ramp system in the closed position.

Clause 11. The method of Clause 10, further comprising securing the one or more pins to one or more second latches of one or more escape slide arming brackets when the ramp system is deployed over and between the first portion of the jetway and the second portion of the floor of the internal cabin.

Clause 12. The method of Clause 11, further comprising engaging one or more release levers of the one or more escape slide arming brackets so that the one or more pins can be removed from the one or more second latches.

Clause 13. A system comprising:
an aircraft comprising an internal cabin having a floor;
a jetway; and
a ramp system configured for use between the jetway and the internal cabin, the ramp system comprising:
a first panel;
a second panel; and
a pivot axle that pivotally couples the first panel to the second panel, wherein the first panel and the second panel are configured to rotate relative to one another about the pivot axle between a closed position, in which the ramp system is stowed within the internal cabin, and an open position, in which the ramp system is deployed over and between a first portion of the jetway and a second portion of the floor of the internal cabin.

Clause 14. The system of claim 13, wherein the pivot axle comprises a hollow cylinder.

Clause 15. The system of Clauses 13 or 14, wherein the ramp system further comprises:
one or more first cuffs that rotatably secure the pivot axle to the first panel; and
one or more second cuffs that rotatably secure the pivot axle to the second panel.

Clause 16. The system of Clause 15, wherein the one or more first cuffs connect to one or more first tabs secured to a first lower surface of the first panel, and wherein the one or more second cuffs connect to one or more second tabs secured to a second lower surface of the second panel.

Clause 17. The system of any of Clauses 13-16, wherein the ramp system further comprises:
one or more first latches extending from a first lower surface of the first panel; and
one or more pins extending from a second lower surface of the second panel, wherein the one or more first latches are configured to receive and retain the one or more pins to secure the ramp system in the closed position.

Clause 18. The system of Clause 17, wherein the one or more pins are configured to be secured to one or more second latches of one or more escape slide arming brackets when the ramp system is deployed over and between the first portion of the jetway and the second portion of the floor of the internal cabin.

Clause 19. The system of Clause 18, wherein one or more release levers of the one or more escape slide arming brackets are configured to be engaged so that the one or more pins can be removed from the one or more second latches.

Clause 20. The system of any of Clauses 13-19, wherein the ramp system further comprises:
one or more first gripping strips extending across a first upper surface of the first panel; and
one or more second gripping strips extending across a second upper surface of the second panel.

As described herein, examples of the present disclosure provide effective and efficient systems and methods for safely moving a wheelchair into and out of an internal cabin of an aircraft from a jetway, such as during boarding and disembarking phases.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for a ramp system configured for use between a jetway and an internal cabin of an aircraft, the ramp system comprising:
   a first panel;
   a second panel; and
   a pivot axle that pivotally couples the first panel to the second panel, wherein the first panel and the second panel are configured to rotate relative to one another about the pivot axle between a closed position, in which the ramp system is stowable within the internal cabin, and an open position, in which the ramp system is deployable over and between a first portion of the jetway and a second portion of a floor of the internal cabin,
   the method comprising:
   moving the ramp system into the closed position by rotating the first panel relative to the second panel in a first rotational direction about the pivot axle;
   stowing the ramp system in the closed position within the internal cabin;
   moving the ramp system into the open position by rotating the first panel relative to the second panel in a second rotational direction about the pivot axle, wherein the second rotational direction is opposite from the first rotational direction; and
   deploying the ramp system in the open position over and between the first portion of the jetway and the second portion of a floor of the internal cabin.

2. The method of claim 1, wherein the ramp system further comprises:
   one or more first latches extending from a first lower surface of the first panel; and
   one or more pins extending from a second lower surface of the second panel,
   wherein the method further comprises receiving and retaining the one or more pins by the one or more first latches to secure the ramp system in the closed position.

3. The method of claim 2, further comprising securing the one or more pins to one or more second latches of one or more escape slide arming brackets when the ramp system is deployed over and between the first portion of the jetway and the second portion of the floor of the internal cabin.

4. The method of claim 3, further comprising engaging one or more release levers of the one or more escape slide arming brackets so that the one or more pins can be removed from the one or more second latches.

5. A system comprising:
   an aircraft comprising an internal cabin having a floor;
   a jetway; and
   a ramp system configured for use between the jetway and the internal cabin, the ramp system comprising:
   a first panel;
   a second panel; and
   a pivot axle that pivotally couples the first panel to the second panel, wherein the first panel and the second panel are configured to rotate relative to one another about the pivot axle between a closed position, in which the ramp system is stowed within the internal cabin, and an open position, in which the ramp system is deployed over and between a first portion of the jetway and a second portion of the floor of the internal cabin.

6. The system of claim 5, wherein the pivot axle comprises a hollow cylinder.

7. The system of claim 5, wherein the ramp system further comprises:
   one or more first cuffs that rotatably secure the pivot axle to the first panel; and
   one or more second cuffs that rotatably secure the pivot axle to the second panel.

8. The system of claim 7, wherein the one or more first cuffs connect to one or more first tabs secured to a first lower surface of the first panel, and wherein the one or more second cuffs connect to one or more second tabs secured to a second lower surface of the second panel.

9. The system of claim 5, wherein the ramp system further comprises:
   one or more first latches extending from a first lower surface of the first panel; and
   one or more pins extending from a second lower surface of the second panel, wherein the one or more first latches are configured to receive and retain the one or more pins to secure the ramp system in the closed position.

10. The system of claim 9, wherein the one or more pins are configured to be secured to one or more second latches of one or more escape slide arming brackets when the ramp system is deployed over and between the first portion of the jetway and the second portion of the floor of the internal cabin.

11. The system of claim 10, wherein one or more release levers of the one or more escape slide arming brackets are configured to be engaged so that the one or more pins can be removed from the one or more second latches.

12. The system of claim 5, wherein the ramp system further comprises:
   one or more first gripping strips extending across a first upper surface of the first panel; and
   one or more second gripping strips extending across a second upper surface of the second panel.

13. A system comprising:
   an aircraft comprising an internal cabin having a floor;
   a jetway; and
   a ramp system comprising:
   a first panel; and a second panel pivotally coupled to the first panel, wherein the first panel and the second panel are rotatable relative to one another between a closed position, in which the ramp system is stowable within the internal cabin, and an open position, in which the ramp system is deployable over and between the jetway and the floor of the internal cabin.

14. The system of claim 13, wherein the first panel is pivotally coupled to the second panel by a pivot axle including a hollow cylinder.

15. The system of claim 13, wherein the ramp system further comprises:
one or more first cuffs that rotatably secure a pivot axle to the first panel; and
one or more second cuffs that rotatably secure the pivot axle to the second panel.

16. The system of claim 15, wherein the one or more first cuffs connect to one or more first tabs secured to a first lower surface of the first panel, and wherein the one or more second cuffs connect to one or more second tabs secured to a second lower surface of the second panel.

17. The system of claim 13, wherein the ramp system further comprises:
one or more first latches extending from a first lower surface of the first panel; and
one or more pins extending from a second lower surface of the second panel, wherein the one or more first latches are configured to receive and retain the one or more pins to secure the ramp system in the closed position.

18. The system of claim 17, wherein the one or more pins are configured to be secured to one or more second latches of one or more escape slide arming brackets when the ramp system is deployed over and between the jetway and the floor of the internal cabin.

19. The system of claim 18, wherein one or more release levers of the one or more escape slide arming brackets are configured to be engaged so that the one or more pins can be removed from the one or more second latches.

20. The system of claim 13, wherein the ramp system further comprises:
one or more first gripping strips extending across a first upper surface of the first panel; and
one or more second gripping strips extending across a second upper surface of the second panel.

\* \* \* \* \*